United States Patent [19]

Horsten

[11] Patent Number: 4,864,573
[45] Date of Patent: Sep. 5, 1989

[54] APPARATUS FOR REPRODUCING A PCM MODULATED SIGNAL, COMPRISING A MUTING CIRCUIT

[75] Inventor: Johannes B. Horsten, Eindhoven, Netherlands

[73] Assignee: Robert Bosch GmbH, Stuttgart, Fed. Rep. of Germany

[21] Appl. No.: 93,452

[22] Filed: Sep. 4, 1987

[30] Foreign Application Priority Data

Sep. 25, 1986 [NL] Netherlands .................. 8602418

[51] Int. Cl.$^4$ .............................................. G06F 11/10
[52] U.S. Cl. ...................................... 371/5.1; 371/40.1
[58] Field of Search ................ 371/38, 62, 5, 39, 40, 371/37; 360/38.1

[56] References Cited

U.S. PATENT DOCUMENTS

| | | | |
|---|---|---|---|
| 4,433,415 | 2/1984 | Kojima | 371/40 X |
| 4,498,175 | 2/1985 | Nagumo | 371/37 |
| 4,675,867 | 6/1987 | Masui | 371/5 X |
| 4,727,547 | 2/1988 | Brandes | 371/38 |

*Primary Examiner*—Jerry Smith
*Assistant Examiner*—Robert W. Beausoliel
*Attorney, Agent, or Firm*—Walter Ottesen

[57] ABSTRACT

An apparatus for reproducing a pulse-code-modulated signal comprises error-correction means (3) for correcting errors in one or more of the data words forming the pcm signal. When the error-correction means are no longer capable of correcting errors in the pcm signal, they produce error flags on an output (7), which error flags are applied to a control unit (9). From these error flags the control unit (9) derives a control signal which is applied to a muting unit (6) for switching on the muting unit.

A method is described by means of which the control unit derives the control signal from the error flags applied to its input (8). A first auxiliary signal ($S_1$) is generated if (at least) $n_1$ error flags are detected within a first time interval ($T_1$). Subsequently, an i-th auxiliary signal ($S_i$) is generated if (at least) $n_i$ error flags are detected within an i-th time interval ($T_i$) which occurs after the instant at which the (i-1)-th auxiliary signal appears. The value of i ranges from 2 to N inclusive. Subsequently, a control-signal generator generates the control signal during a time interval $T_m$ which occurs after the instant at which the N-th auxiliary signal is received (FIG. 2). A number of examples of the control unit are described (FIG. 4).

16 Claims, 4 Drawing Sheets

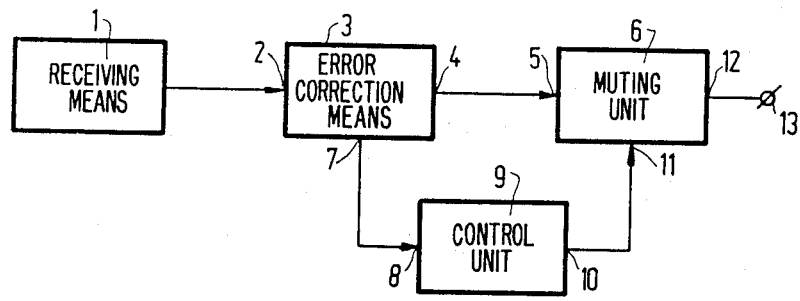
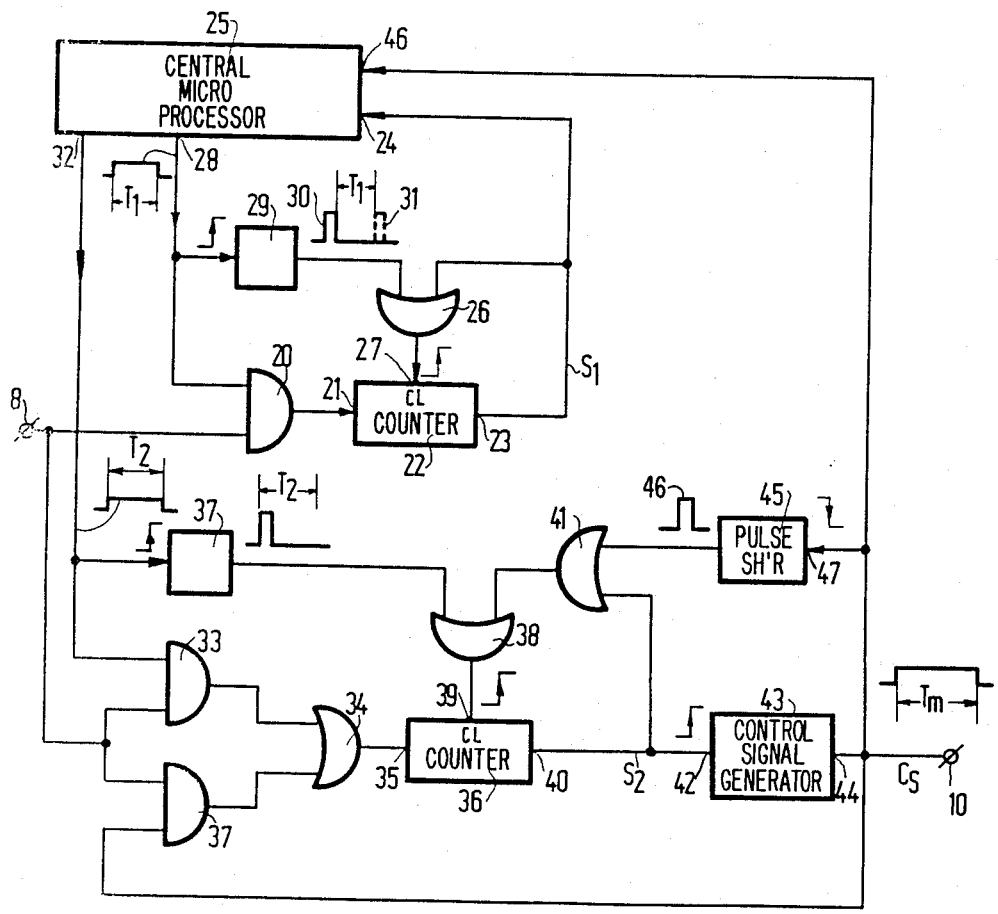

APPARATUS FOR REPRODUCING A PCM MODULATED SIGNAL, COMPRISING A MUTING CIRCUIT

The invention relates to an apparatus for reproducing a pulse-code-modulated signal from a transmission channel, for example a track of a record carrier, which pulse-code-modulated signal is contained in a sequence of consecutive data words, comprising
- receiving means for receiving the pulse-code-modulated signal from the transmission channel and for supplying the received signal to an input of
- error-correction means for correcting errors in one or more of the data words, comprising a first output for supplying the data words, which may have been corrected, and a second output for supplying an error flag if the error-correction means are no longer capable of correcting the error in the data word,
- a control unit having an input, coupled to the second output of the error-correction means, and an output, which control unit is constructed to generate a control signal in response to the error flags applied to its input and to apply this control signal to its output,
- a muting unit having a signal input coupled to the first output of the error-correction means, a control input coupled to the output of the control unit, and an output, which muting unit is constructed to transfer the signal applied to its input to its output in the absence of the control signal on its control input and is constructed to hold the signal on its output at a specific fixed value for a specific time interval when the control signal is present on its control input.

Such an apparatus is known, for example, from Philips Technical Review, Vol. 40, 1982, No. 6. This publication relates to the Compact Disc Digital Audio System. In particular, the article "Error correction and concealment in the Compact Disc System" by H. Hoeve et al, pp. 166–172 describes a system for correcting inerroneous values of samples of an equidistantly sampled signal.

In this system samples of an analog audio signal are recorded on a disc ("Compact Disc") in digitally encoded form. Flaws or finger-marks etc. on the disc may give rise to errors when the digital information is read. In order to correct these errors the digital information is recorded on the disc in encoded form and, in addition, error-correcting codes are recorded on the disc. This enables some of the errors to be corrected completely. However, scratches and the like may give rise to a very large number of consecutive errors, referred to as an error burst. If the number of errors is larger than can be corrected by means of the error-correcting codes these errors are merely detected. During reading after decoding of the information these errors may result in one or more samples with an incorrect value being detected. If one incorrect sample is detected, its value is estimated by (for example, linear) interpolation between the values of one or more preceding and succeeding samples. It is alternatively possible to select the value of the incorrect sample to be equal to that of the preceding sample. If two or more consecutive incorrect samples are detected the value of the samples is made equal to zero ("muting"). In order to obtain a gradual transition the value of a number of preceding and succeeding samples changes gradually to zero.

A more comprehensive description of the error correction in the Compact Disc System is given in the Philips publication "Electronic Components and Applications", namely in Vol. 4., 1982, No. 3, the article "ICs for Compact Disc Decoders" by J. Matull, pp. 131–141 and in Vol. 6 1984, No.4, the article "An integrated approach to CD players" by J. Nijhof, in particular Part 2 of this article "The decoding electronics" on pages 216–222.

The transmission channel mentioned in the foregoing is the track on a compact disc. In general, the transmission channel may be a track on an optical, magnetic or other type of record carrier. The receiving means are then read means for reading the pulse-code modulated signal from the track of the record carrier. Another possibility is that the transmission channel is, for example, a telephone channel.

The error-correction means may be constructed to correct only errors in the samples or to correct samples, and, if this is not possible, to interpolate between samples, if desired in conjunction with a hold function if the number of incorrect samples is too large for interpolation alone. A possible interpolation method is described in, for example, the Applicant's published European Patent application No. 146,988 (PHN.10,859).

The muting unit may be constructed to suppress the signal completely in the absence of the control signal. This means that said fixed value is zero. Alternatively, the muting unit may maintain the signal at the value of the last correct sample when the control signal is present. In that case said fixed value is equal to the value of this last correct sample and the muting unit is in fact a hold circuit.

The control unit determines when, after how many error flags, and for how long the muting unit is operative.

It is the object of the invention to provide a control unit which is very suitable for deriving the control signal from the error flags applied to its input. To this end the apparatus is characterized in that the control unit comprising N counters ($N \geq 2$), in that the first counter is constructed to count the number of error flags appearing within a first time interval $T_1$ and is constructed to supply a first auxiliary signal after detection of $n_1$ error flags within the time interval $T_1$, in that the i-th counter is constructed to count the number of error flags appearing within an i-th time interval $T_i$ which occurs after the instant at which the (i-1)-th counter supplies the (i-1)-th auxiliary signal, and is constructed to supply an i-th auxiliary signal after detection of $n_i$ error flags within the time interval $T_i$, i ranging from 2 to N inclusive, and $n_1$ to $n_N$ being integers greater than or equal to 1, and in that the control unit further comprises a control-signal generator having an input for receiving the N-th auxiliary signal and an output coupled to the output of the control unit, which control-signal generator is constructed to supply the control signal to its output for a time interval $T_m$ which occurs after the instant at which the N-th auxiliary signal is received. When the counters are constructed as digital units the control unit has the advantage that it can be integrated easily. The i-th time interval may occur immediately after the instant at which the (i-1)th auxiliary signal is supplied. Another possibility is that the i-th time interval $T_i$ appears with a delay with respect to the instant at which the (i-1)-th auxiliary signal is supplied. Similarly, the time interval $T_m$ may occur directly after the instant at which the N-th auxiliary signal is supplied. In this case another possibility is again that the time interval $T_m$ appears with a delay with respect to the instant at which the N-th auxiliary signal is supplied.

The control unit may further comprise an (N+1)-th counter which is constructed to supply an (N+1)-th auxiliary signal after the detection of $n_m$ error flags within the time interval $T_m$, and the control-signal generator may be further constructed to prolong the time interval in which the control signal appears, for example an extension by the difference in time between the appearance of the N-th and the (N+1)-th auxiliary signal. In this way it is achieved that after the occurrence of $n_m$ error flags the time interval $T_m$ is prolonged and in the last-mentioned case is even restarted, so that the control signal is no longer applied to the muting unit. It is obvious that this process may be repeated each time that again $n_m$ error flags are detected during the presence of the control signal.

It is possible to take $n_m$ and $n_n$ to be equal to each other. This opens the possibility of utilizing the N-th counter also as the (N+1)-th counter, which reduces the number of counters.

If N is 2, then $n_1$ is suitably greater than $n_2$. If N is 3, it is preferred that $n_1 > n_2 > n_3$. In the case that $T_1 \leq T_2$ (for N=2) and $T_1 \leq T_2 \leq T_3 \leq$ (for N =3), this means that the muting unit is not switched on until there are definitely errors in the samples and that the muting unit is not switched off until there are only a few errors left and the signal is again of (more or less) hi-fi quality. The apparatus may be characterized further in that the functions of the first to the N-th counter are combined in a single counter, This enables the control unit to be simplified even further and it also enables the control unit, if integrated, to be substantially smaller and to occupy less space on the substrate of the integrated circuit.

Further, the i-th counter may be adapted to count only those $n_i$ error flags which are associated with $n_i$ data words which are received directly after each other and which appear within the time interval $T_i$, i ranging from 1 to N inclusive. In particular, in the case of directly succeeding error flags a correct interpolation is no longer possible, so that it is important that the muting unit is then switched on.

Embodiments of the invention will now be described in more detail, by way of example, with reference to the accompanying drawings. In the drawings FIG. 1 shows an embodiment of the invention;

FIG. 4 shows a first example of the control unit;

Figure 2:
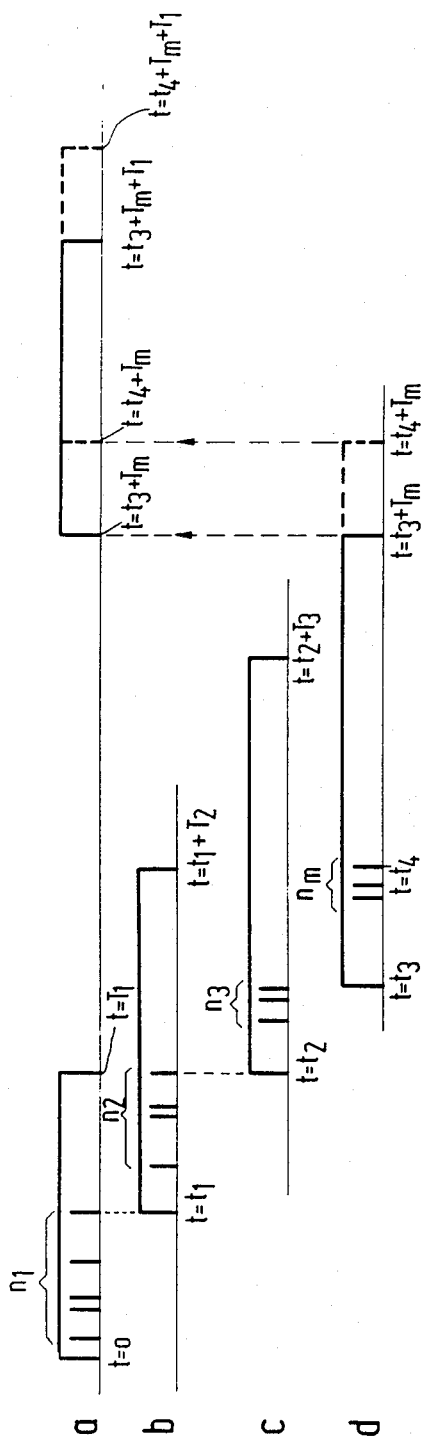
FIG. 2 illustrates the operation of the control unit in the apparatus of FIG. 1.

FIG. 1 shows an apparatus for reproducing a pulse-code-modulated signal from a transmission channel, comprising receiving means 1 for receiving the pcm signal from the transmission channel. The receiving means supply the pcm signal, which is contained in data words. to an input 2 of error-correction means 3 for correcting errors in one or more of the data words. The error-correction means 3 supply the data words, which have been corrected when necessary, to a first output 4 which is coupled to an input 5 of a muting unit 6. If the error-correction means are not capable of correcting the error in a data word, they supply an error flag to the second output 7 which is coupled to an input 8 of a control unit 9. The output 10 of the control unit 9 is coupled to a control input 11 of the muting unit 6. The output 12 of the muting unit 6 is coupled to the output terminal 13 of the apparatus.

The error-correction means 3 derive the pcm-encoded signal from the data words and, as stated in the foregoing, they subject either the data words or the samples which are derived therefrom and which form the pcm-encoded signal to error correction and, if necessary, interpolation.

Somewhere in the chain between the output 4 and the output terminal 13 the apparatus may further comprise a D/A converter for converting the pcm encoded signal into an analog signal. If this D/A converter precedes the muting unit 6 this unit is an analog muting unit. In the other case the muting unit 6 is a digital muting unit.

The control unit 9 is constructed to produce a control signal on its output 10 in response to the error flags applied to its input 8.

The operation of the control unit 9 will now be explained hereinafter. FIG. 2 shows a possible mode of operation of the control unit 9. In a first time interval $T_1$ (from t=0 to t=$T_1$, see FIG. 2a) it is ascertained whether n1 error flags are applied to the input 8. For this purpose the control unit comprises a first counter (the counter 22 in FIG. 5). If the number of error flags detected in the time interval $T_1$ is not $n_1$ the control unit remains in a state in which it ascertains whether $n_1$ error flags are detected within a time interval $T_1$ (which may be a running time interval). If this is the case (i.e. at the instant $t_1$, see FIG. 2b), a first auxiliary signal (the auxiliary signal $S_1$ in FIG. 5) is supplied, after which a second counter (the counter 36 in FIG. 5) ascertains whether $n_2$ error flags have arrived at the input 8 within the second time interval $T_2$ (from t=$t_1$ till t=$t_1$+$T_2$) after the appearance of the first auxiliary signal. If this is not the case, the unit changes over to the first counter and ascertains whether $n_1$ error flags occur within a following first time interval $T_1$ If $n_2$ error flags are detected within the time interval $T_2$ (i.e. at the instant $t_2$, see FIG. 2c) a second auxiliary signal is generated (the auxiliary signal $S_2$ in FIG. 5), after which a third counter (the counter 53 in FIG. 5) ascertains whether $n_3$ error flags occur within a third time interval $T_3$ (from t=$t_2$ to t=$t_2$+$T_3$) after the appearance of the second auxiliary signal. If this is not the case, this results in changing over to the first counter and it is ascertained whether $n_1$ error flags fall within a subsequent first time interval $T_1$. If $n_3$ error flags are detected within the time interval $T_3$ (i.e. at the instant $t_3$, see FIG. 2d) a third auxiliary signal is generated (the auxiliary signal $S_3$ in FIG. 5). From this instant the control unit produces the control signal on its output 10 for a time interval $T_m$ (from t=$t_3$ to t=$t_3$+$T_m$, see FIG. 2d). When the time interval has elapsed it is again possible to change over to the first counter to detect $n_1$ error flags in a subsequent first time interval $T_1$ after the instant $t_3$+$T_M$ (i.e. the time interval from t=$t_3$+$T_m$ till t=$t_3$+$T_M$+$T_1$, (see FIG. 2a).

It is alternatively possible to provide the control unit with a fourth counter (the counter 63 in FIG. 5) for counting the error flags which fall within the time interval $T_m$ (from t=$t_3$ till t=$t_3$+$T_m$, see FIG. 2d). At the instant t=$t_4$ the fourth counter has detected $n_m$ error flags and a fourth auxiliary signal is supplied, after which the time interval $T_m$ within which the control signal is supplied is prolonged by the time difference $t_4$−$t_3$, see the dashed extension in FIG. 2d in the time interval $t=t_3+T_m$ and $t=t_4+T_m$. In fact, the time interval $T_m$ begins again at the instance $t=t_4$.

It is obvious that the time interval $T_m$ may be prolonged even further if again $n_m$ error flags are detected before expiry of the time interval $T_m$. It is evident from FIG. 2b that no more error flags are detected in the time interval $t=t_4$ to $t=t_4+T_m$. At the latter instant the control signal on the output 10 is terminated.

The control signal which is applied to the control input 11 of the muting unit 6 ensures that the muting unit suppresses the signal applied to its input 5 during the time interval $t=t_3$ till $t=t_4+T_m$(muting). This may mean that from $t=t_3$ the gain of the muting unit 6 initially varies in accordance with a gradual curve from the preset value (for example 1x) to the value zero (0x), remaining zero for a specific time, and just before the interval has elapsed (i.e. prior to $t=t_4+T_m$) or from the instant at which the interval has elapsed (i.e. from $t=t_4+T_m$) again increases to the preset value (for example again 1x in conformity with a gradual curve. Another possibility is that the muting unit 6 holds the last correct sample during the time interval $T_m$, if desired with a gradual transmission to the value of the correct samples at the end of the time interval $T_m$.

It is obvious that either in the connection between the output 4 of the error-correction means 4 and the input 5 of the muting unit 6 or in the connection between the output 10 of the control unit 9 and the control input 11 a delay may be provided in order to compensate for an asynchronism between the signals on the outputs 4 and 10 of the error-correction means 3 and the control unit 9 respectively.

In the example of FIG. 2 the values for $n_1$, $n_2$, $n_3$ and $n_m$ are 5, 4, 3 and 3 respectively. It is also possible to select other values. The choice of the values in fact depends on the wish when the muting unit is to be switched on and when the muting unit is to be switched off again. The choice also depends on the length of the time intervals $T_1$, $T_2$, $T_3$ and $T_m$.

If $T_1 < T_2 < T_3$ it is preferred to select $n_1 > n_3$ Further, it is not necessary to take $n_m$ to be equal to n $n_M (=n_3)$ Some typical values for $n_1$, $n_2$ and $n_3$ are given in the following table.

| $n_1$ | $n_2$ | $n_3$ |
|---|---|---|
| 4 | 2 | 2 |
| 5 | 4 | 3 |
| 6 | 4 | 2 |
| 7 | 5 | 3 |
| 8 | 5 | 3 |
| 8 | 6 | 3 |
| 9 | 4 | 2 |
| 9 | 5 | 2 |
| 9 | 5 | 3 |

This table is non-exhaustive.

The mode of operation as described with reference to FIG. 2 may also be extended to cover more than (N =) three times intervals. For N=4 this would mean, for example, that after detection of the $n_3$ error flags a third auxiliary signal is applied, after which a fourth counter counts whether and, if so when $n_4$ error flags are detected in a fourth time interval $T_4$, which then extends from $t=t_3$ to $t=t_3+T_4$. If this is the case, a fourth auxiliary signal supplied in response to which the control unit produces the control signal on its output 10 during a time interval $T_m$ after the occurrence of the fourth auxiliary signal.

From FIGS. 2b and 2c it appears that the second time interval $T_2$ and the third time interval $T_3$ occur immediately after detection of $n_1$ and $n_2$ error flags respectively. This is not necessary. It is also possible to choose for a delayed occurrence of the time intervals $T_2$ and $T_3$ after detection of $n_1$ and $n_2$ error flags respectively. Further, it is evident from FIG. 2b that the time interval $T_m$ occurs immediately after $n_3$ error flags have been detected in the time interval $T_3$. Again it is possible to choose for a delayed occurrence of the time interval $T_m$ after detection of $n_3$ error flags.

Figure 3:
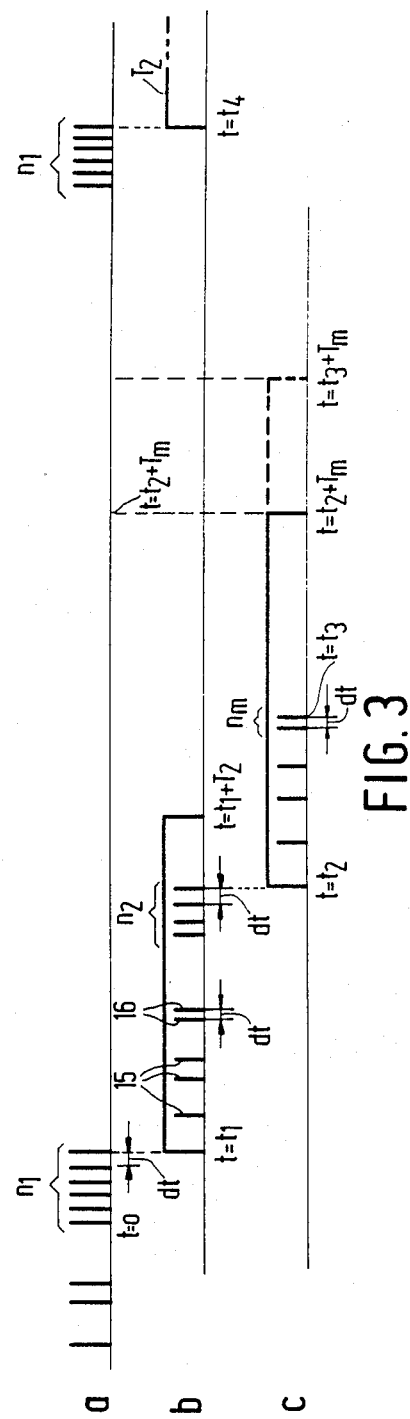
FIG. 3 illustrates another mode of operation of the control unit of FIG. 1.

FIG. 3 illustrates another mode of operation of the control unit 9. In this case the counters are adapted to detect only those $n_i$ error flags which are associated with $n_i$ data words which are received immediately after one another and fall within the time interval $T_i$. In this case i ranges from 1 to N inclusive. The (N+1)-th counter is also adapted to count only those $n_m$ error flags associated with $n_m$ data words which are read immediately after each other and fall within the time interval $T_m$. Here, N is equal to 2. The first time interval $T_1$ is now at least equal to $(n_1-1)$dt, see FIG. 3a. In the mode of operation illustrated in FIG. 3a the first counter $n_1$ detects error flags which follow each other at intervals dt, after which the first auxiliary signal is supplied (at the instant $t=t_1$ in FIG. 3b).

In FIG. 3a the time interval $T_1$ is not indicated, but it covers at least the time interval between $t=0$ and $t=t_1$ and it is even exactly equal to this time interval if $T_1=(n_1-1)$dt.

At the instant $(t=t_1)$ at which the first auxiliary signal appears, the second counter ascertains whether $n_2$ error flags occur at intervals dt from each other within the second time interval $T_2$ (from $t=t_1$ till $t=t_1+T_2$ in FIG. 3b). FIG. 3b shows an example where $n_2$ is 4. Nevertheless, the counter will not respond to the three error flags 15 which are spaced from one another at intervals larger than dt. The counter does count the two error flags 16 which are spaced at intervals dt from each other but then returns to the counter position zero, because in this case less than four error flags are detected which directly follow each other at intervals dt. At the instant $t=t_2$ the second counter has counted $n_2$ (=four) error flags which follow each other directly. Now a second signal is generated in response to which the control unit produces the control signal on its output 10 during the time interval $T_m$(from $t=t_2$ till $t=t_2+T_m$)

If a third counter has not detected nm error flags which directly follow each other at intervals dt within the time interval $T_m$ the control signal is terminated at the instant $t=t_2+T_m$. From $t=t_2+T_m$ the first counter is switched on again to detect $n_1$ error flags within a time interval $T_1$. If $n_m$ (equal to two) error flags associated with two data words which are read immediately after each other are detected within the time interval $T_m$ (at the instant $t=t_3$ in FIG. 3c), a third auxiliary signal is generated in response to which the time interval may be prolonged by the time difference $t_3-t_2$. The control signal on the output 10 of the control unit is then sustained until the instant $t=t_3+T_m$. If subsequently within the time interval from $t_3$ to $t_3+T_m$ no $n_m$ directly succeeding error flags are detected, the control signal is terminated at the instant $t_3+T_m$ and the first counter is switched on again to detect $n_1$ directly succeeding error flags. It follows from FIG. 3a that this happens at the instant $t=t_4$, after which the second time interval $T_2$ is started again, see FIG. 3b.

In the example of FIG. 3 the values for $n_1$, $n_2$ and $n_m$ are 6, 4 and 2, respectively. If desired, other values may be selected. Again the choice of the values in fact depends on the wish when the muting unit is to be switched on and when the muting unit is to be switched off. The choice also depends on the length of the time intervals $T_1$, $T_2$ and $T_m$. In the case that $T_1 \leq T_2$ it is preferred to take $n_1 > n_2$. Further, it is preferred to select $n_m \leq n_2$.

Some typical values for $n_1$ and $n_2$ are given in the following table.

| $n_1$ | $n_2$ |
|---|---|
| 4 | 2 |
| 5 | 2 |
| 6 | 2 |
| 6 | 3 |
| 6 | 4 |
| 7 | 2 |
| 7 | 3 |
| 7 | 4 |
| 8 | 2 |
| 8 | 3 |
| 8 | 4 |
| 8 | 5 |

This table is non-exhaustive.

The mode of operation as described with reference to FIG. 3 may also be extended to cover more than (N=) two time intervals. Further, if desired, the time interval $T_2$ and/or $T_m$ may again occur with a delay after the detection of the $n_1$ and $n_2$ directly succeeding error flags in the time intervals $T_1$ and $T_2$ respectively.

FIG. 4 shows a first example of the control unit in the apparatus in accordance with the invention. The input 8 of the control unit is coupled to the count input 21 of a first counter 22 via an AND gate 20. The counter 22 is constructed to count $n_1$ error flags applied to the count input 21 and to supply a first auxiliary signal $S_1$ on its output 23 after $n_1$ error flags have been counted. The output 23 is coupled to a first input 24 of a central (micro) processor 25 and is coupled to the clear input 27 of the counter 22 via an OR gate 26. A first output 28 of the processor 25 is coupled to the count input 21 via the AND gate 20 and to the clear input 27 of the counter 22 via a pulse shaper 29 and the OR gate 26.

The processor 25 determines the time interval $T_1$ via the output 29. The output signal on the output 28 is then high. This means that the error flags applied to the input 8 during said time interval are transferred to the count input 21 of the counter 22 by the AND gate 20. The rising edge in the signal on the output 28, which edge defines the beginning of the time interval $T_1$, ensures that the pulse shaper 29 supplies a pulse 30, which is applied to the clear input 27 via the OR gate 26. The output 23 of the counter is a logic "low", so that the rising edge of the pulse 30 sets the counter 22 to zero.

The counter 22 counts all error flags which occur within the time interval $T_1$. If the number of error flags within the time interval $T_1$ is not $n_1$, which means that $S_1$ remains "low", the signal on the output 28 goes briefly "low" at the end of the interval $T_1$ and goes "high" again, so that the pulse shaper 29 again supplies a pulse 31 which sets the counter 22 to zero, as a result of which the counter can count the error flags applied to the input 8 in a subsequent first time interval $T_1$.

It is now assumed that the counter 22 counts $n_1$ error flags within the time interval $T_1$. At this instant the counter 22 produces the first auxiliary signal $S_1$ on its output 23, because $S_1$ changes from a logic "low" level to a "high" level. The first auxiliary signal resets the counter to zero. Moreover, the auxiliary signal $S_1$ is applied to the input 24 of the processor 25, causing the signal on the output 28 to go "low" again. At this instant a "high" signal appears on an output 32 of the processor 25. The signal on the output 32 defines the length of the second time interval $T_2$.

The output 32 is coupled to a count input 35 of a second counter 36 via an AND gate 33 and an OR gate 34. The input 8 is coupled to the count input 35 of the counter 36 both via the AND gate 33 and the OR gate 34 and via an AND gate 37 and the OR gate 34. Further, the output 32 of the processor 25 is coupled to a clear input 39 of the counter 36 via a pulse shaper 37 and an OR gate 38. The output 40 of the counter 36 is coupled to a clear input 39 via an OR gate 41 and the OR gate 38. The output 40 of the counter 36 is further coupled to an input 42 of the control-signal generator 43. The output 44 of the control-signal generator 43 is coupled to the count input 35 of the counter 36 via the AND gate 37 and the OR gate 34, to the clear input 39 of the counter 36 via a pulse shaper 45 and the OR gates 41 and 38, and to a second input 46 of the processor 25.

At the instant at which the signal on the output 32 starts the second time interval $T_2$ a "high" signal appears on one input of the AND gate 33. Error flags applied to the input 8 can now reach the count input 35 of the counter 36 via the AND GATE 33. The rising edge in the signal from the output 32 produces a pulse in the pulse shaper 37, which pulse is applied to the clear input 39 via the OR gate 37 and sets the counter 36 to zero. The counter 36 counts the error flags applied to the input 8 from the beginning of the time interval $T_2$. As long as the counter 36 has not counted $n_2$ error flags the output 40 remains "low" and the output 44 of the control signal generator 43 is also "low".

If the counter 36 counts less than $n_2$ error flags within the time interval $T_2$ the output 40 of the counter 36 and the output 44 of the control-signal generator 43 remain "low". This means that the input 46 still receives a "low" signal at the end of the time interval. The signal on the output 32 goes "low" again and the processor 25 again supplies a "high" signal to the output 28 for a subsequent first time interval $T_1$, If the counter 36 has counted $n_2$ error flags within the time interval $T_2$ the output 40 goes "high" when counter position $n_2$ is reached. The counter then supplies the second auxiliary signal $S_2$ to the control-signal generator 43, which is for example a monostable multivibrator, so that the output 44 goes "high" and a control signal CS is produced on the output 10. Moreover, the second auxiliary signal $S_2$ ensures that the counter 36 is reset to zero via the OR gates 41 and 38. Since the output 44 is "high" the error flags applied to the input 8 can reach the input 35 of the counter 36 via the AND gate 37 and the OR gate 34, regardless of whether the processor 25 still supplies the output signal defining the time interval $T_2$. When the time interval $T_2$ expires, the processor 25 will not produce a signal on its output 28 as long the signal on the input 46 is "high" (i.e. the control signal is present on the output 10 of the control unit).

As already stated, the control-signal generator 43 is monostable multivibrator supplying a pulse of a length $T_m$ on its output 44 after receipt of a rising edge on its input 2. During the time interval $T_m$ the counter 36 again counts the error flags applied to its input 35 via the input 8, the AND gate 37 and the OR gate 34. If the counter has counted less than $n_m$ (=$n_2$) error flags, the output 44 of the control-signal generator 43 returns to a "low" level after the time interval $T_m$. The second counter 36 is set to zero on account of the pulse 46 from the pulse shaper 45, which supplies this pulse 46 on the falling edge on its input 47. Moreover, the AND gate 37 is inhibited and the falling edge on the output 44, which is applied to the input 46 of the central processor 25, again ensures that a new first time interval $T_1$ is started. If the counter 36 has counted $n_m$ error flags within the time interval $T_m$ a this auxiliary signal, in the present case the second auxiliary signal $S_2$, is produced on its output 40.

Since the control-signal generator 43 is a retriggerable monostable multivibrator the control-signal generator 43 will produce a "high" signal on its output 44 during the time interval $T_m$ after the appearance of the second rising edge on its input 42. Moreover, the counter 36 is reset to zero so that the counter can count the error flags applied to its input 35 via the input 8, the AND gate 37 and the OR gate 34 during the time interval $T_m$.

A special feature of this example is that the second counter for counting the ($n_2$) error flags within the time interval $T_2$ and the third counter for counting the ($n_m$) error flags within the time interval $T_m$, are the same.

Figure 5:
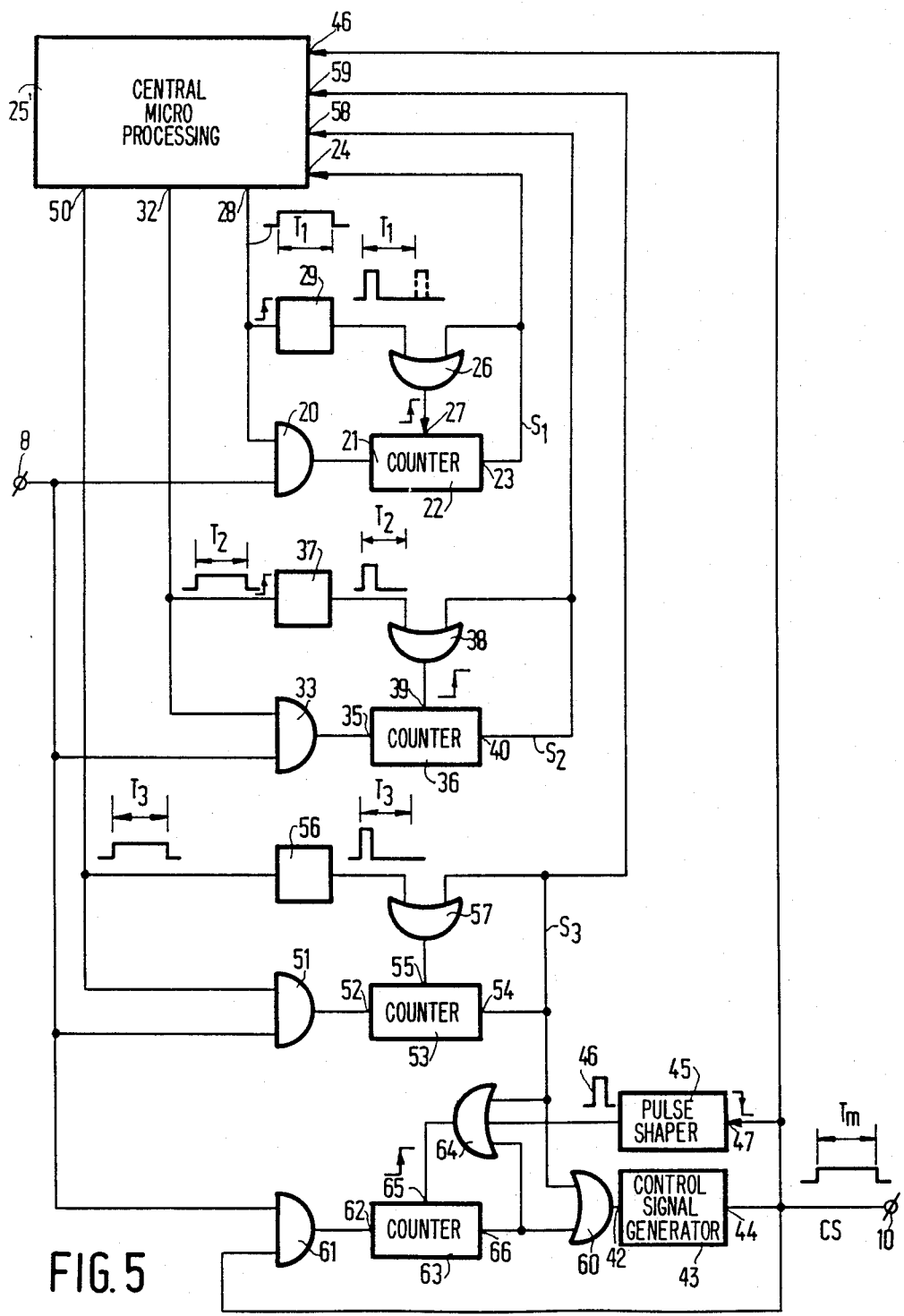
FIG. 5 shows a second example of the control unit.

FIG. 5 shows another example. The circuit associated with the first counter 22 for counting the ($n_1$) error flags within the time interval $T_1$ and the second counter 36 for counting the ($n_2$) error flags within the time interval $T_2$ is identical to that shown in FIG. 4.

The central processor has an output 50 which is coupled to an AND gate 5 and also to a clear input 55 of a third counter 53 via a pulse shaper 56 and an OR gate 57. The input 8 is coupled to the count input 52 of the counter 53, via the OR gate 51, which counter 53 has an output 54 coupled to its clear input 35 via the OR gate 57 and to an input 59 of the central processor 25'.

If at a given instant the counter 36 has counted $n_2$ error flags within the time interval $T_2$ the counter 36 produces the second auxiliary signal $S_2$ on its outputs 40. This auxiliary signal is applied to the central processor 25' via the input 58. Subsequently the processor 25' produces a "high" signal on its output 50 during a time interval $T_3$, causing the AND gate 51 to be opened for the transfer of error flags applied to the input 8 within this time interval. Moreover, the rising edge in the signal on the output 50 produces a pulse on the output of the pulse shaper 56, so that the counter is set to zero at the beginning of the time interval $T_3$.

If the counter 53 has not counted $n_3$ error flags the output signal on the output 50 goes "low" again at the end of the time interval $T_3$ and a new first time interval $T_1$ is started because the signal on the output 28 goes "high". If the counter 53 does count $n_3$ error flags within the time interval, the output 54 of the counter 53 goes "high". This is the third auxiliary signal $S_3$, which is applied to the input 59 of the processor 25'. The processor 25' interrupts the time interval $T_3$ if it has not yet elapsed completely. The third auxiliary signal $S_3$ resets the counter 53 to zero via the OR gate 57. Further, the third auxiliary signal is applied to the input 42 of the control-signal generator 43 via an OR gate 60, causing the output 44 of this generator to go "high" and to remain "high" for the time interval $T_m$ following the third auxiliary signal $S_3$.

As the control signal CS is also applied to the AND gate 61 the error flags applied to the input 8 via this OR gate 61 can reach the input 62 of a fourth counter 63. This counter 63 counts the error flags within the time interval $T_m$. At the beginning of the time interval $T_m$ the counter 63 is reset to zero by the auxiliary signal $S_3$ which is applied to its clear input 65 via the OR gate 64. If the counter 63 counts less than $n_m$ error flags within the time interval $T_m$, the control-signal generator goes back to a "low" level on its output 44. The counter 63 is reset to zero by the pulse 46 from the pulse shaper 45 and the processor 25' again generates a first time interval $T_1$ When the counter 63 counts $n_m$ error flags the output 66 of the counter 63 goes "high". This rising edge reaches the input 42 of the retriggerable monostable multivibrator via the OR gate 60, causing the time interval $T_m$ to be restarted. Moreover, the rising edge on the output 66, which is applied to the clear input 65 via the OR gate 64, resets the counter 63 to zero.

Figure 6:
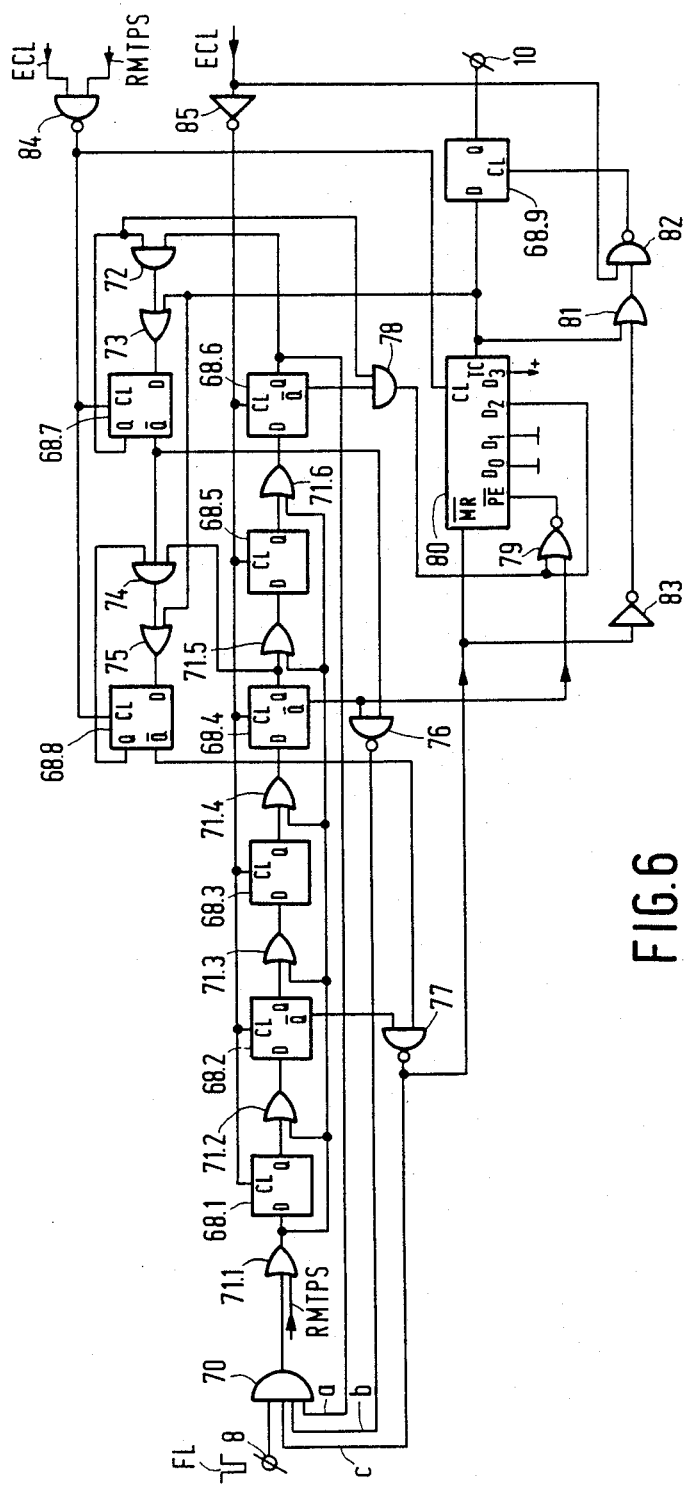
FIG. 6 shows a third example of the control unit used in the apparatus in accordance with the invention.

FIG. 6 shows another example. In this example all the counters are combined to form a single counter. Moreover, use is made of counters which are adapted to count only those $n_i$ error flags which are associated with $n_i$ data words which are received (read) directly after one another and which appear within the time interval $T_i$, i ranging from 1 to N inclusive (in the present case three).

The (combined) counter comprises a shift register in the form of six D flip-flops 68.1 to 68.6 . Together the six D flip-flops constitute the first counter. This means that $n_1=6$. The four D flip-flops 68.1 to 68.4 constitute the second counter. This means that $n_2=4$. The flip-flops 68.1 and 68.2 constitute the third counter. This means that $n_3=2$. Moreover, the flip-flops 68.1 and 68.2 form the counter for counting the error flags in the time interval $T_m$. This means that $n_m=2$.

The input 8 to which the error flags are applied is coupled to the D input of the flip-flop 68.1 via an AND gate 70 and an OR gate 71.1. The Q-output of this flip-flop 68.1 is coupled to the D-input of the flip-flop 68.2 via an OR gate 71.2. The Q outputs of this flip-flop and of subsequent flip-flops are each coupled to the D input of a subsequent flip-flop via an OR gate, namely the OR gates 71.3 to 71.6. Further, the output of the OR gate 71.1 is coupled to a second input of the OR gates 71.2 to 71.6. The Q output of the flip-flop 68.6 is coupled to a second input of the AND gate 70. The Q output of the flip-flop 68.6 is further coupled to the D input of the flipflop 68.7 via an AND gate 72 and an OR gate 73. The $\overline{Q}$ output of the last-mentioned flip-flop is coupled to the D input of a flip-flop 68.8 via an AND gate 74 and an OR gate 75. The Q outputs of the flip-flops 68.7 and 68.8 are coupled to second inputs of the AND gates 72 and 74 respectively. The $\overline{Q}$ outputs of the flip-flops 68.7 and 68.8 are coupled to a third input and a fourth input respectively of the AND gate 70 via NAND gates 76 and 77 respectively. Further, the $\overline{Q}$ outputs of the flip-flops 68.4 and 68.2 are coupled to second inputs of the NAND gates 76 and 77 respectively. This means that $n_2=4$ and $n_3=2$.

The $\overline{Q}$ output of the flip-flop 68.6 and the Q output of the flip-flop 68.7 are both coupled to a parallel-enable input $\overline{PE}$ and to the input $D_2$ of the four-bit an AND gate 78 and a NOR gate 79. The $\overline{Q}$ output of the flip-flop 68.4 is also coupled to the parallel-enable input $\overline{PE}$ via the NOR gate 79. The output of the coupled to the master-reset input MR of the counter 80. The inputs $D_0$ and $D_1$ of the counter 80 are coupled to earth. The input $D_3$ is coupled to the positive power-supply voltage. The output TC is coupled to the second inputs of the OR gates 73 and 75, is further coupled to the D input of a flip-flop 68.9, and is also coupled to the clock input Cl of this flip-flop 68.9 via an OR gate 81 and a NAND gate 82. The output of the NAND gate 77 is further coupled to a second input of the OR gate 81 via an inverter 83. The output of a NAND gate 84 is coupled to the clock inputs Cl of the flip-flops 68.7 and 68.8. A first signal ECL and a second signal RMTPS is applied to the NAND gate 84. The signal ECL is the clock signal and the signal RMTPS is a condition signal, which defines a cycle and which comprises pulses of a substantially lower frequency than the clock signal ECL. The signal RMTPS is also applied to a second input of the OR gate 71.1. The output of an inverter 85 is coupled to the clock inputs Cl of the D flip-flops 68.1 to 68.6. The signal ECL is applied to the inverter 85. The signal ECL is further applied to a second input of the NAND gate 82. The Q output of the D flip-flop 68.9 is coupled to the output 10 for supplying the control signal. The circuit operates as follows.

The circuit is intended for detecting $n_1$, $n_2$ and $n_3$ error flags respectively, which appear immediately after each other, as described for example with reference to FIG. 3, the difference being that the circuit shown in FIG. 6 is not started directly after detection of $n_1$ error flags but with a slight delay. Similarly, the time interval $T_3$ is started with a slight delay after detection of $n_2$ error flags within the time interval $T_2$. The signal on the input 8 is normally a logic "high". If an error flag FL occurs this becomes apparent in the input signal in that it goes briefly "low". In the initial situation the Q outputs of the flip-flops 68.1 to 68.8 are "high" or logic "1". This means that the signals a, b and c applied to the second, the third and the fourth input of the AND gate 70 are "1". The error flags which occur coincide in time with the clock instants ECL.

If at a subsequent clock instant an error flag FL appears on the input 8, the flip-flop 68.1 assumes a "0" state. If at the next clock instant an error flag FL appears, the flip-flop 68.2 also assumes a "0 state. This means that the Q outputs of the two flip-flops are "0". If at the next clock instant no error flag is present, the Q outputs of the two flip-flops 68.1 and 68.2 return to "1". After six consecutive clock instants at which an error flag appears the Q outputs of the flip-flops 68.1 to 68.6 are all "0". At this instant the AND gate 70 is inhibited for further error flags by means of the signal a, which is logic "0". The circuit remains in this state, regardless of the fact that clock pulses ECL are applied to the circuit. Only at the instant at which the signal RMTPS goes briefly "high", the following will happen at the simultaneously occurring clock instant ECL.
(a) The logic "0" on the Q output of flip-flop 68.6 is applied to the D input of the flip-flop 68.7 via the AND gate 72 and the OR gate 73 (the output TC of the counter 80 is "0"), causing the Q output of the flip-flop 68.7 to go "0".
(b) the Q outputs of the flip-flops 68.1 to 68.6 are set to "1", and
c) the counter 80 is activated because under the influence of the signal applied to the parallel-enable input $\overline{PE}$ via the AND gate 78 and the NOR gate 79 the count of the counter is made equal to the 4-bit number appearing on the inputs $D_o$ to $D_4$, i.e. 1100 (the binary code for the number 12).

Now the second time interval is started in fact. This means: with a delay after the detection of six consecutive error flags. The time interval $T_2$ is now determined by the counter 80, which counts up further from the count 1100 under the influence of the pulses RMTPS. If no further error flags are detected the counter proceeds to 1111 (binary code for the number 15), after which the output TC goes high. On the next RMTPS pulse the D flip-flop 68.7 is set, i.e. its Q output goes "1". The time interval $T_2$, which is equal to four times the time interval between two consecutive RMTPS pulses, has now elapsed. Subsequently, counting of 6 consecutive error flags is started again, as described in the foregoing.

If four directly succeeding error flags are detected within the time interval $T_2$ the Q outputs of the D flip-flops 68.1 to 68.4 are all "0". The signal b now becomes a logic "0", so that the AND gate 70 is again inhibited for subsequent error flags.

The D flip-flops 68.1 to 68.4 remain in this state It is not until the instant at which the signal RMTPS goes briefly "1" that the following happens at the clock instants ECL which occur simultaneously.
(a) The logic "0" appearing on the Q output of the flip-flop 68.4 is applied to the D input of the flip-flop 68.8 via the AND gate 74 and the OR gate 75 (the output TC of the counter 80 is "0"), causing the Q output of the flip-flop 68.8 to become "0".
(b) the Q outputs of the flip-flops 68.1 to 68.4 are set to "1",
(c) the counter 80 is set to 1000 (binary code for the number 8) under the influence of the signal which is applied from the the $\overline{Q}$ output of the D flip-flop 68.4 to the parallel-enable input $\overline{PE}$ via the NOR gate 79. This is because the Q output of the D flip-flop 68.7 is "0" and, consequently, the input $D_2$ of the counter 80 is "0".

Now the third time interval is started in fact. This means: with a delay after the detection of four successive error flags in the time interval $T_2$. The counter now determines the time interval $T_3$ as follows: It is assumed that no more error flags occur. Under the influence of consecutive RMTPS pulses the counter 80 counts from the count 1000 to the count 1111, upon which TC goes high again. Upon the next RMTPS pulse the flip-flops 68.7 and 68.8 are set, i.e. their Q outputs become "1". The time interval $T_3$, which is equal to eight times the time interval between two consecutive RMTPS pulses, has now expired. Counting of 6 consecutive error flags is now started, as described in the foregoing. If two directly succeeding error flags are detected within the time interval $T_3$, the Q outputs of the flip-flops 68.1 and 68.2 are "0". The output of the NAND gate 76 goes "low"so that the signal c becomes "0" and the AND gate 70 is inhibited for further error flags. the counter 80 is set to the count 0000 as a result of the "0" on the $\overline{MR}$ input. The TC output is "0". As a result of the "0" signal on the output of the NAND gate 77, which signal is applied to the NAND gate 82 via the inverter 83 and the OR gate 81, the Q output of the D flip-flop 68.9 goes "low" on the next clock pulse ECL. The control unit now supplies the control signal for the muting unit.

The counter 80 now counts up from the count 0000 on consecutive RMTPS pulses. When it is assumed that no succeeding error flags are detected, the counter counts up to the count 1111 (binary code for the number 15) and TC goes "high". The next RMTPS pulse not only sets the Q outputs of the flip-flops 68.1 to 68.6 to "1" but also the Q outputs of the flip-flops 68.7, 68.8 and 68.9, so that the initial situation is restored. Consequently, the time interval $T_m$ is equal to 16 times the time interval between two RMTPS pulses.

If again two succeeding error flags are detected within the time interval $T_m$ the count is again set to 0000 and the time interval T is restarted.

It is to be noted that various modifications to the embodiments shown are possible without departing from the scope of the invention as defined in the appended claims.

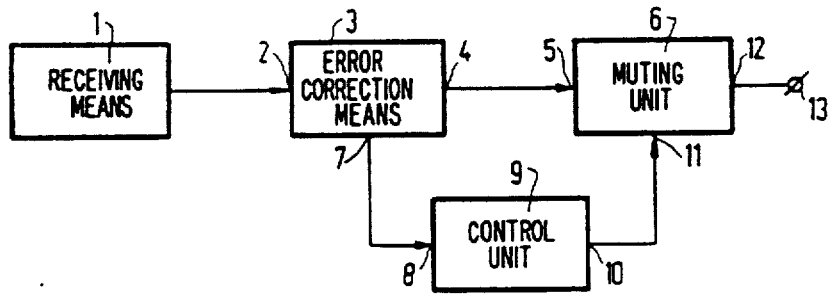

What is claimed is:

1. An apparatus for reproducing a pulse-code-modulated signal from a transmission channel, for example a track of a record carrier, which pulse-code-modulated signal is contained in a sequence of consecutive data words, comprising:
    receiving means for receiving the pulse-code-modulated signal from the transmission channel and for producing a received signal;
    error-correction means receiving the received signal for correcting errors in one or more of the data words in the received signal, comprising a first output for supplying the data words, which may have been corrected, and a second output for supplying an error flag if the error-correction means are no longer capable of correcting the error in the data word,
    a control unit having an input, coupled to the second output of the error-correction means, and an output, which control unit is constructed to generate a control signal in response to the error flags applied to its input and to apply this control signal to its output,
    a muting unit having a signal input coupled to the first output of the error-correction means, a control input coupled to the output of the control unit, and an output, which muting unit is constructed to transfer the signal applied to its input to its output in the absence of the control signal on its control input and is constructed to hold the signal on its output at a specific fixed value for a specific time interval when the control signal is present on its control input, characterized in that the control unit comprises N counters, where N is greater than or equal to two, in that the first counter is constructed to count the number of error flags appearing within a first time interval $T_1$ and is constructed to supply a first auxiliary signal after detection of $n_1$ error flags within the time interval $T_1$, in that the 1-th counter is constructed to count the number of error flags appearing within a i-th time interval $T_i$ which occurs after the instant at which the (i-1) - th counter supplies the (i-1) - th auxiliary signal, and is constructed to supply an i-th auxiliary signal after detection of $n_i$ error flags within the time interval $T_i$, i ranging time from 2 to N inclusive and nl to $n_N$ being integers greater than or equal to 1, and in that the control unit further comprises a control-signal generator having an input for receiving the N-th auxiliary signal and an output coupled to the output of the control unit, which control-signal generator is constructed to supply the control signal to its output for a time interval $T_m$ which occurs after the instant at which the N-th auxiliary signal is received.

2. An apparatus as claimed in claim 1, characterized in that the control unit comprises an (N+1)-th counter which is constructed to supply an (N+1)-th auxiliary signal after detection of $n_m$ error flags within the time interval $T_m$, and in that the control-signal generator is further constructed to prolong the time interval in which the control signal appears.

3. An apparatus as claimed in claim 2, characterized in that the control signal generator is constructed to prolong the time interval in which the control signal appears by the difference in time between the appearance of the N-th and the (N+1)-th auxiliary signal.

4. An apparatus as claimed in claim 1, characterized in that $n_m$ is smaller than or equal to $n_N$.

5. An apparatus as claimed in claim 1, characterized in that the N-th counter also functions as the (N+1)-th counter.

6. An apparatus as claimed in any one of the preceding claim 1, characterized in that N is equal to 2 and in that $n_1$ is greater than $n_2$.

7. An apparatus as claimed in claim 6, characterized in that the first time interval $T_1$ is smaller than or equal to the second time interval $T_2$.

8. An apparatus as claimed in claim 1, characterized in that N is equal to 3 and that $n_1$ is greater than $n_3$.

9. An apparatus as claimed in claim 8, characterized in that $n_1 > n_2 > n_3$.

10. An apparatus as claimed in claim 9, characterized in that $T_1 \leq T_2 \leq T_3$.

11. An apparatus as claimed in claim 1, characterized in that the functions of the first to the N-th counter are combined in a single counter.

12. An apparatus as claimed in claim 1, characterized in that the i-th counter is adapted to count only those $n_i$ error flags which are associated with $n_i$ data words which are received directly after each other and which appear within the time interval $T_i$, i ranging from 1 to N inclusive.

13. An apparatus as claimed in claim 12, characterized in that (N+1)-th counter is adapted to count only those $n_m$ error flags associated with $n_m$ data words which are read directly after each other and which appear within the time interval $T_m$.

14. An apparatus as claimed in claim 1, characterized in that the i-th time interval $Ti$ occurs with a delay after the instant at which the (i-1)-th auxiliary signal is supplied.

15. An apparatus as claimed in claim 1, characterized in that the time interval $T_m$ appears with a delay after the instant at which the N-th auxiliary signal is supplied.

16. In an apparatus for reproducing a pulse-code-modulated signal contained in a sequence of consecutive data words from a transmission channel, said apparatus having:
    receiving means for receiving the pulse-code-modulated signal from the transmission channel and for producing a received signal corresponding to the pulse-code-modulated signal;
    error correcting means for receiving the received signal for correcting errors in one or more of the data words, the error correcting means having a first output for supplying the data words, which may have been corrected, and a second output for supplying an error flag if the error correction means are no longer capable of correcting the error in the data word;
    a muting unit having a signal input coupled to the first output of the error correction means, a control input for receiving a control signal and an output, the muting unit being constructed to transfer the signal applied to its input to its output in the absence of the control signal on its control input and being constructed to mute the signal on its output when the control signal is present on its control input;

the improvement comprising:

a control unit having an input coupled to the second output of the error-correction means and an output connected to the control input of the muting unit for generating a control signal in response to the error flags applied to its input and applying this control signal to its output;

said control unit comprising:

a first counter for counting error flags and for producing a first auxiliary signal if the error flags counted by said first counter during a first time period meet a first predetermined criteria;

at least a second counter for counting error flags in response to the first auxiliary signal and for producing a second auxiliary signal if the error flags counted by said second counter during a second time period meet a second criteria; and said control unit having means for producing the control signal in response to the first and second auxiliary signals and for terminating the control signal in response to the absence of the first and second auxiliary signals.

* * * * *

UNITED STATES PATENT AND TRADEMARK OFFICE
CERTIFICATE OF CORRECTION

PATENT NO. : 4,864,573

DATED : Sep. 5, 1989

INVENTOR(S) : Johannes B. Horsten

It is certified that error appears in the above-identified patent and that said Letters Patent is hereby corrected as shown below:

The title page should be deleted to appear as attached title page.

Signed and Sealed this

Third Day of March, 1992

Attest:

HARRY F. MANBECK, JR.

*Attesting Officer*      *Commissioner of Patents and Trademarks*

United States Patent [19]

Horsten

[11] Patent Number: 4,864,573
[45] Date of Patent: Sep. 5, 1989

[54] APPARATUS FOR REPRODUCING A PCM MODULATED SIGNAL, COMPRISING A MUTING CIRCUIT

[75] Inventor: Johannes B. Horsten, Eindhoven, Netherlands

[73] Assignee: U.S. Philips Corporation, New York, N.Y.

[21] Appl. No.: 93,452

[22] Filed: Sep. 4, 1987

[30] Foreign Application Priority Data

Sep. 25, 1986 [NL] Netherlands ................ 8602418

[51] Int. Cl.⁴ ............................................. G06F 11/10
[52] U.S. Cl. ................................. 371/5.1; 371/40.1
[58] Field of Search .............. 371/38, 62, 5, 39, 40, 371/37; 360/38.1

[56] References Cited

U.S. PATENT DOCUMENTS

| | | | |
|---|---|---|---|
| 4,433,415 | 2/1984 | Kojima | 371/40 X |
| 4,498,175 | 2/1985 | Nagumo | 371/37 |
| 4,675,867 | 6/1987 | Masui | 371/5 X |
| 4,727,547 | 2/1988 | Brandes | 371/38 |

Primary Examiner—Jerry Smith
Assistant Examiner—Robert W. Beausoliel
Attorney, Agent, or Firm—Marianne R. Rich

[57] ABSTRACT

An apparatus for reproducing a pulse-code-modulated signal comprises error-correction means (3) for correcting errors in one or more of the data words forming the pcm signal. When the error-correction means are no longer capable of correcting errors in the pcm signal, they produce error flags on an output (7), which error flags are applied to a control unit (9). From these error flags the control unit (9) derives a control signal which is applied to a muting unit (6) for switching on the muting unit.

A method is described by means of which the control unit derives the control signal from the error flags applied to its input (8). A first auxiliary signal ($S_1$) is generated if (at least) $n_1$ error flags are detected within a first time interval ($T_1$). Subsequently, an i-th auxiliary signal ($S_i$) is generated if (at least) $n_i$ error flags are detected within an i-th time interval ($T_i$) which occurs after the instant at which the (i-1)-th auxiliary signal appears. The value of i ranges from 2 to N inclusive. Subsequently, a control-signal generator generates the control signal during a time interval $T_m$ which occurs after the instant at which the N-th auxiliary signal is received (FIG. 2). A number of examples of the control unit are described (FIG. 4).

16 Claims, 4 Drawing Sheets